United States Patent
Harwell et al.

(10) Patent No.: US 11,912,012 B2
(45) Date of Patent: *Feb. 27, 2024

(54) DIRECT TO MESH SCREEN STENCIL CREATION

(71) Applicant: DuralChrome AG, Niederrohrdorf (CH)

(72) Inventors: John Cecil Harwell, Pinea de Mar (ES); Shlomo Hermon, Winterhur (CH); Alexander Kleinmann, Dübendorf (CH)

(73) Assignee: DuralChrome AG, Niederrohrdorf (CH)

( * ) Notice: Subject to any disclaimer, the term of this patent is extended or adjusted under 35 U.S.C. 154(b) by 57 days.

This patent is subject to a terminal disclaimer.

(21) Appl. No.: 17/846,993

(22) Filed: Jun. 22, 2022

(65) Prior Publication Data

US 2022/0314597 A1 Oct. 6, 2022

Related U.S. Application Data

(63) Continuation of application No. 16/767,362, filed as application No. PCT/EP2018/068047 on Jul. 4, 2018, now Pat. No. 11,376,837, which is a continuation-in-part of application No. PCT/EP2017/050214, filed on Jan. 5, 2017.

(51) Int. Cl.
*B41M 1/12* (2006.01)
*B41F 15/36* (2006.01)
*B41C 1/14* (2006.01)
*B41N 1/24* (2006.01)
*B41M 7/00* (2006.01)

(52) U.S. Cl.
CPC .............. *B41C 1/147* (2013.01); *B41F 15/36* (2013.01); *B41M 1/12* (2013.01); *B41M 7/0081* (2013.01)

(58) Field of Classification Search
CPC ......... B41C 1/147; B41N 1/247; B41F 15/36; B41M 1/12
See application file for complete search history.

(56) References Cited

U.S. PATENT DOCUMENTS

| | | | | |
|---|---|---|---|---|
| 5,819,653 A | * | 10/1998 | McCue | B41C 1/147 101/128.21 |
| 6,038,971 A | * | 3/2000 | Fischer | B41C 1/14 101/128.4 |
| 2016/0214317 A1 | * | 7/2016 | Kobayashi | B29C 64/40 |

FOREIGN PATENT DOCUMENTS

CN 109501437 A * 3/2019 ............. B41C 1/147

* cited by examiner

*Primary Examiner* — Daniel J Colilla
(74) *Attorney, Agent, or Firm* — Workman Nydegger

(57) ABSTRACT

A direct to mesh (DtM) screen printer for creating a screen stencil is provided. The DtM screen printer includes a frame to hold a pre-stretched mesh in place during application of a jettable emulsion, a fixture to hold the frame, a platen to hold a release fluid against one side of the pre-stretched mesh, a fluid dispenser for dispensing the release fluid onto the platen or mesh, and a printer carriage supporting a print head for printing the jettable emulsion on a side of the pre-stretched mesh opposite the platen. A process is also provided, the process being for using the DtM screen printer to prepare the screen stencil for screen printing.

13 Claims, 3 Drawing Sheets

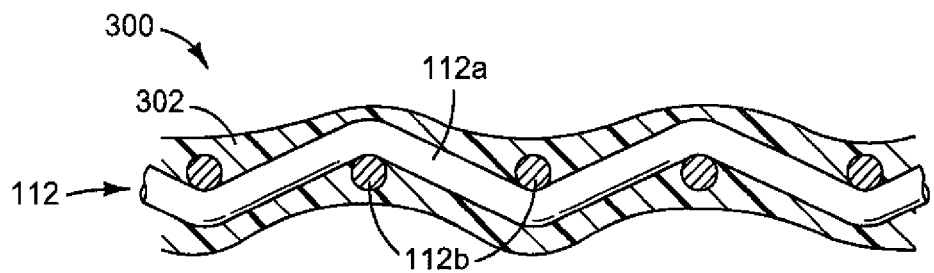

FIG. 3A

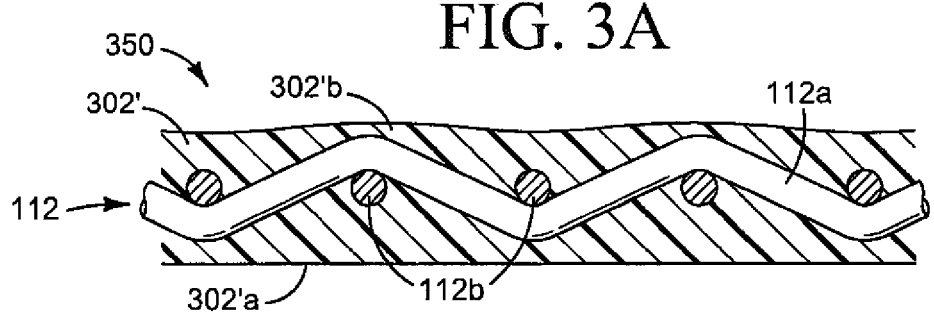

| 405 | Provide a direct to mesh screen printer, including a fixture to hold a frame, which is configured to hold a pre-stretched mesh in place during application of a jettable emulsion, a platen to hold a release fluid against one side of the pre-stretched mesh, and a printer carriage supporting a print head for printing the jettable emulsion on a side of the pre-stretched mesh opposite the platen |
|---|---|
| 410 | Place the frame in the fixture |
| 415 | Dispense the release fluid onto the platen or mesh |
| 420 | Apply the jettable emulsion to the mesh |
| 425 | Cure the jettable emulsion using UV radiation |

FIG. 4

DIRECT TO MESH SCREEN STENCIL CREATION

CROSS-REFERENCE TO RELATED APPLICATIONS

This application is a continuation of U.S. Pat. No. 11,376,837, issued Jul. 5, 2022, application Ser. No. 16/767,362, filed May 27, 2020, which claims priority from application no. PCT/EP2017/050214, filed 5 Jan. 2017.

BACKGROUND

Screen printing is a printing technique whereby a mesh is used to transfer ink onto a substrate, except in areas made impermeable to the ink by a screen printing stencil, also called a blocking stencil. A blade or squeegee is moved across the screen to fill the open mesh apertures with ink, and a reverse stroke then causes the screen to touch the substrate momentarily along a line of contact. This causes the ink to wet the substrate and be pulled out of the mesh apertures as the screen springs back after the blade has passed.

The creation of a screen printing stencil is a tedious, labor-intensive job. It is one that requires a number of process steps, chemical products, lots of water, and is largely manual. It is the least automated part of the current screen printing business.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

FIGS. 3A-3B schematically illustrate an emulsion on a mesh, providing a comparison between current technology (FIG. 3A) and the teachings herein (FIG. 3B), according to an example of the present disclosure.

FIG. 4 is a flow chart illustrating a method of screen printing, according to an example of the present disclosure.

DETAILED DESCRIPTION

Figure 1:
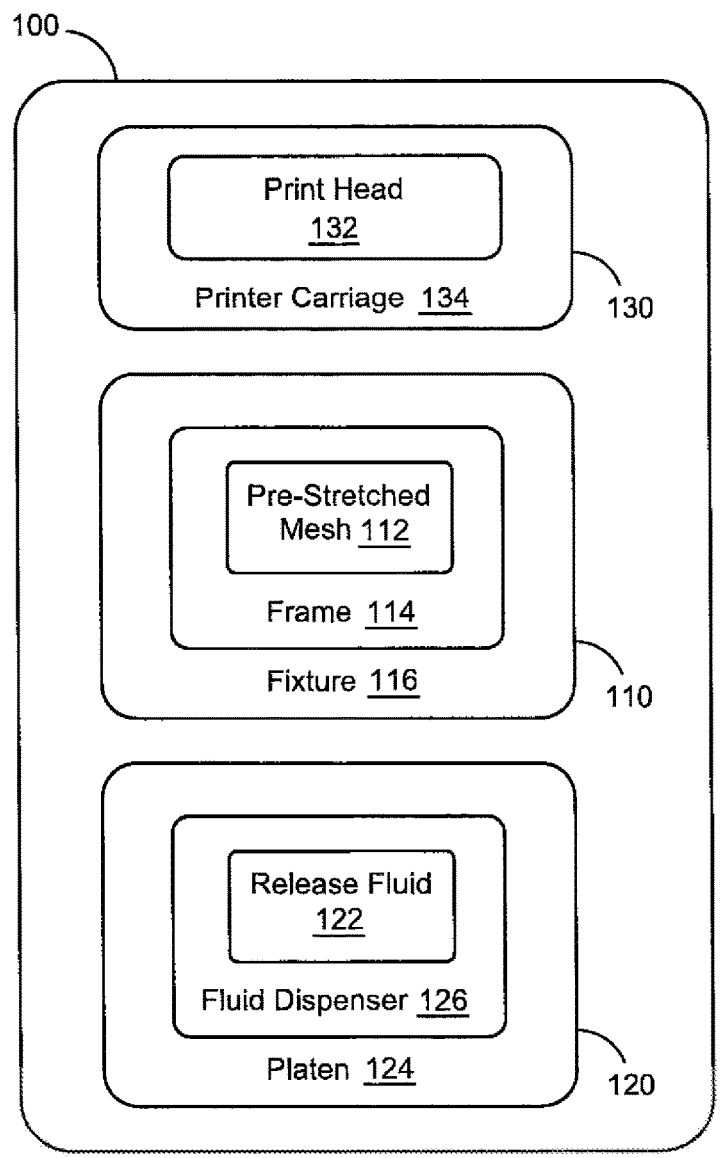
FIG. 1 illustrates a direct to mesh screen printer, according to an example of the present disclosure.

There are several examples of previous solutions for directly coating a mesh to form a stencil for screen printing. These are now described.

Mesh Preparation and Coating:

Direct application of emulsion: this is done either with a machine or by hand. Both sides of the screen must be coated with the emulsion to ensure proper coverage. The machine or automated version is strictly a machine replacing a human. The machine is much more accurate at applying precise amounts of the emulsion and getting even coverage. The machine generally has less waste.

Capillary films: These are films that are pre-coated with an emulsion. The mesh is oversaturated with water and the film (emulsion side down) is placed against the supersaturated mesh. The capillary action draws the emulsion into the mesh. This gives a more precise coating of the emulsion, both in thickness and in cover. Once the emulsion has diffused into the mesh, the film is peeled off.

Once the screen mesh is emulsified it must be dried. Once dry, it is ready for the image transfer or making of the stencil. As the emulsion dries, it contracts and conforms to the mesh causing a rough, uneven surface. (This rough surface causes an accelerated aging of the squeegee during the printing process.)

Most emulsions today are activated by ultra-violet (UV) radiation (i.e., UV-activated) but may also be visible-light activated. Once coated, the stencils must be protected from any exposure to light (even normal visible light has enough UV to start the curing process). Hereinafter, it is assumed that the emulsion is UV-activated/cured.

Image Transfer/Stencil Making:

In screen printing, there is one stencil for every color, typically cyan, magenta, yellow, and black (CMYK) plus one for every spot color (a spot color is one based on discrete colors, usually that might not be readily achievable with CYMK colors). The areas of the stencil where one does not want the inks to go through are blocked by an emulsion that is subsequently cured to form the stencil; all other areas have only mesh. Any opening in the mesh may either be completely blocked or partially blocked by the emulsion to form the stencil.

Film Positive Ink: A totally black, UV absorbent layer is printed onto a clear sheet of plastic. The printing is done normally by laser or inkjet printers with special film positive inks (film positive ink means a high opacity black ink that completely blocks all visible and UV light). The film is then attached to the pre-coated mesh and exposed to UV light. The attachment is usually by a removable tape (such as masking tape). Once exposed, the film is removed and the uncured emulsion is washed off.

However, this approach is very labor intensive at all stages, and it is not possible to automate many steps. In addition, it is prone to error, such as during mounting the film, using the correct film, adjusting the final stencil before print. Lots of chemicals and washing, as well as lots of consumables (inks, films), are required.

Thermal Screen: In this method, the mesh is pre-coated with a thermally-activated emulsion. Typically, the mesh (without a frame) is put into a thermal printer, where the emulsion is directly cured/activated. Once completed, the un-exposed emulsion is washed off, the stencil is mounted on a frame, and printed.

However, this approach suffers from limited mesh counts. Also, the emulsions are not as robust. The pre-treated mesh is expensive. The stencil alignment is more intensive. Finally, the stencil can be damaged while it is being mounted.

Computer to Screen (CtS)-Printed: In this method, the coated mesh is directly printed onto the emulsified screen with a high-opacity black ink. This is similar to Film Positive Inks without the film. All of the processes are the same.

However, these machines require a high-opacity ink, which is more expensive than regular inkjet inks.

CtS-Wax: This method is a close relative of CtS-Printed, but uses wax to block the UV light. All else is the same.

However, due to the use of melted wax, these machines can be temperamental. Further, they require that the wax be heated to apply it to the mesh.

CtS-Direct Exposure: This technology directly exposes the emulsion using a UV laser.

However, the machines used in this technology are typically very expensive. Further, the process does not work as well on coarse grade mesh. Finally, UV lasers are still very expensive even when they need replacing.

Each of the above methods require some post-processing/follow-up. Except for Thermal Activated and CtS Direct Exposure, all stencils must be exposed after the image blocking is applied (either films or CtS Printed and Wax). This process takes about 1 to 2 minutes per screen with an intense developer.

All screens must have the excess emulsion washed off. Care must be taken so that the emulsion does not get into the drainage system. Screens must be dried after washing.

For the Film and Thermal Activated methods, the finished stencil must be fine adjusted when placed on the carousel to ensure proper registration.

Current Disclosure:

It is clear from the foregoing description of the current technology that a simpler approach that uses fewer chemicals and less water would be desirable.

As disclosed and claimed herein and in accordance with the teachings herein, a Direct to Mesh (DtM) approach to forming a stencil involves directly applying and activating/exposing an emulsion onto a screen using inkjet technology. In particular, and in accordance with the teachings herein, a DtM screen printer includes:
  a frame to hold a pre-stretched mesh in place during application of a jettable emulsion;
  a fixture to hold the frame;
  a platen to hold a release fluid against one side of the pre-stretched mesh;
  a fluid dispenser for dispensing the release fluid onto the platen or mesh; and
  a printer carriage supporting a print head for printing the jettable emulsion on a side of the pre-stretched mesh opposite the platen.

FIG. 1 depicts a block diagram of the direct to mesh (DtM) printer 100. The DtM printer 100 includes a mesh support system 110 that includes the pre-stretched mesh 112 held in place by the frame 114. The frame 114 is in turn held by the fixture 116. The fixture 116 securely and firmly holds the frame 114 with the pre-stretched mesh 112 in place during the application of the jettable emulsion.

As used herein, the mesh 112 is made of connected strands of textiles, fiber, metal, or other flexible/ductile materials, here, woven in a crisscross pattern. The material comprising the mesh may be any of a number of textiles (silks, polyesters); metals, such as stainless steel; or plastic, such as polypropylene, polyethylene, nylon, polyvinyl chloride (PVC) or polytetrafluoroethylene (PTFE): or fiberglass. The diameter of the strands may be any diameter common in screen printing, and the mesh size may also be any size common in screen printing. Coarser mesh is typically woven with larger diameter (gauge) strands, which requires a thicker application of the emulsion.

The DtM printer 100 further includes a platen support system 120, including a release fluid 122 held against the underside of the pre-stretched mesh 112 by a platen 124. The platen 124 provides a smooth flat surface for the release fluid 122 held firmly against the bottom of the pre-stretched mesh 112. The platen 124 is configured to be as smooth as possible, impermeable to fluids, and resistant to dents and cracks. The platen 124 may also act to dissipate energy from a UV curing source 208 (not shown in FIG. 1, but shown in FIG. 2D).

The release fluid 122 may be applied (sprayed or wiped or brushed, for example) directly on the platen 124 or onto the mesh 112 once it is in position over the platen prior to the application of the jettable emulsion. For example, a fluid dispenser 126 for introducing or dispensing the release fluid 122 onto the platen 124 may comprise one or more sprayers 126. The sprayer(s) 126 may be ordinary misters or other spraying-type elements.

The release fluid 122 inhibits dot-gain, which is the effect of a printed fluid spreading into a print medium, by not reacting with the curing emulsion. Dot-gain need only be inhibited for a short period, as the curing occurs very quickly after the emulsion fluid is jetted.

Finally, the DtM printer 100 includes an inkjet printer 130 that includes a print head 132 mounted on a printer carriage 134. The print head 132 is configured to print the jettable emulsion on the side of the pre-stretched mesh 112 opposite to that of the platen 124. The printer carriage 134 is a high-precision printer carriage, accurate in both the X and Y Cartesian directions to support accurate droplet placement over one or more passes while building up the jettable emulsion. Indeed, the emulsion can be "built up" to accommodate a wide range of mesh gauges, from very fine to super coarse. The layering can be used to maintain high resolution as it builds up the emulsion.

The print head 132 may be an inkjet print head, such as thermal inkjet, piezoelectric inkjet, drop-on-demand inkjet, or other suitable jetting printhead capable of jetting fluids, including the jettable emulsion disclosed herein.

The screen mesh 112, which may be of any type, even quite expensive or cheap and any gauge, is stretched onto the frame 114. The frame 114 is put into the inkjet printer 130 with the release fluid 122 which has been placed on the platen 124. The jettable emulsion is then applied by the inkjet printer 130 to the masking areas and substantially simultaneously exposed with high intensity UV lamps or other suitable UV source, such as UV-light emitting diodes (LEDs). The wavelength of the UV lamp (or LED) may be tuned to the reaction range of the jettable emulsion for optimal performance. For the jettable emulsion disclosed herein, the emulsion reacts at a wavelength of 395 nanometers (nm). Other jettable emulsions may have other reaction wavelengths, including lower than 395 nm. For coarse mesh, the application may be a multi-pass operation in order to build up the necessary emulsion thickness. By "coarse mesh" is meant mesh having a loose weave, and thus having larger gaps between the strands than a fine mesh screen. For example, 335 mesh count is considered to be fine mesh, while 110 mesh count is considered to be coarse mesh, where mesh count is the number of thread crossings per square inch.

The Direct to Mesh process disclosed herein is made possible with the recent development of low viscosity jettable emulsions. By "low viscosity" is meant a range from about 4 centipoises (cP) to about 15 cP (about 4 millipascal second to about 15 millipascal second). These new jettable emulsions are used to create an embossing effect with UV printers onto a wide variety of materials. These new jettable emulsions are also more elastic, so they can be used more readily as a replacement for previous emulsions. Any color can be used for the jettable emulsion, including transparent or clear, although light cyan or light magenta may be used to provide a slight contrast in order to verify the stencil.

An example of a jettable emulsion that may be suitably employed in the process disclosed herein is a UV-activated acrylate monomer with elastomeric qualities after curing. The jettable emulsions are specialty embossing "varnish" polymers that quickly cure into both highly durable/resistant layers that quickly build up on the substrate. The cured polymer is also durable and flexible/elastic (if it were rigid, it would crack easily under use and render the stencil useless). VersaUV (Roland DG) technology is an example of a material that may be useful in the practice of the teachings herein.

The release fluid 122 is configured to provide a smooth, non-reactive printing surface under the mesh 112. It also serves to limit dot gain of the printed emulsion. Dot gain occurs when a jetted droplet (or dot) expands or spreads out before the UV exposure. This is particularly important when a half tone is employed, i.e., less than the entire space in the mesh is filled with emulsion. However, the dot-gain need only be inhibited for a short period as the UV curing occurs very quickly after the emulsion is jetted.

The release fluid 122 is a fluid that manages the dot gain and is non-reactive with the curing emulsion so that it does not lift or separate the emulsion from the mesh 112. The fluid for the release fluid 122 may be modified or tailored for the jettable emulsion by changing certain characteristics, including, but not limited to, changing the surface tension, ionic mix, polar or non-polar components, or whether the fluid is aqueous or non-aqueous.

The release fluid 122 may be water-based (e.g., distilled water), either water alone or with at least one emulsifier in a sufficient amount to prevent evaporation of the release fluid. Examples of emulsifiers, along with a class of emulsifiers known as surfactants, include, but are not limited to, polysorbates, glycerins, and glycols, such as butyl cellosolve. In some embodiments, the emulsifier(s) may be may be present in an amount of at least 3 vol % to 5 vol % to prevent evaporation of the release fluid 122. Further examples of the release fluid 122 include water-based varnishes, such as butyl acetate, xylene, xylol, dimethyl benzene, and combinations thereof.

The release fluid 122 is deposited either directly onto the platen 124 or onto the mesh 112 after the mesh is placed onto the platen 124. In most preparations in the current art, the emulsion can be quite rough; this is often caused by conformance of the emulsion to the mesh during the drying process. This rough emulsion surface can wear away at the squeegee, requiring resurfacing or replacing of the squeegee blade. In the Direct to Mesh process, however, when the jettable emulsion is built up in the mesh, the release fluid 122 ensures a very smooth surface; see, for example, FIG. 3B and its associated discussion.

Since the only emulsion that is applied to the mesh 112 is in a blocking area, there is no over-shoot or over-exposure from reflection of the UV light into masked areas. This provides a much smoother, cleaner image. (These over-shoot and over-exposure areas can create spots or drops inside the image, especially around the edges. These are the "inverse" of pin holes.)

The platen 124 provides a smooth, hard, impermeable surface for the release fluid 122 and gently pushes the mesh 112 taut to ensure a good even, flat surface upon which to apply the emulsion. In some embodiments, the platen 124 does not absorb the release fluid 122 or interact, chemically or physically, with it and is planar (±0.05 mm/meter). By "smooth" is meant that the surface of the platen 124 is a regular surface that can either be polished/glossy or frosted/matte as long as the surface is regular.

Example steps of the Direct to Mesh process are depicted in FIGS. 2A-2E, which are cross-sectional views of the DtM apparatus.

Figure 2A:
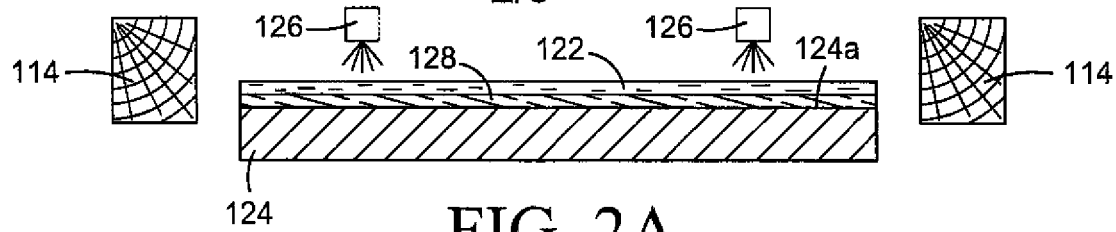
FIGS. 2A-2E depict, in cross-sectional view, elements of a process in screen printing, using a direct to mesh screen printer, according to an example of the present disclosure.

In FIG. 2A, frame 114 surrounds platen 124. The fixture 116 for supporting the frame 114 is omitted in this Figure and in FIGS. 2B-2E. The frame fixture 116 is similar to what is currently used in the art. One or more elements, or sprayers, 126 spray a layer of release fluid 122 on a top surface 124a of the platen 124. The sprayer(s) 126 may be fixed in position or configured to traverse across the platen 124. It will be appreciated that the release fluid can be applied in a number of different ways: e.g. wiping, brushing, and the like, as well as spraying.

Figure 2B:
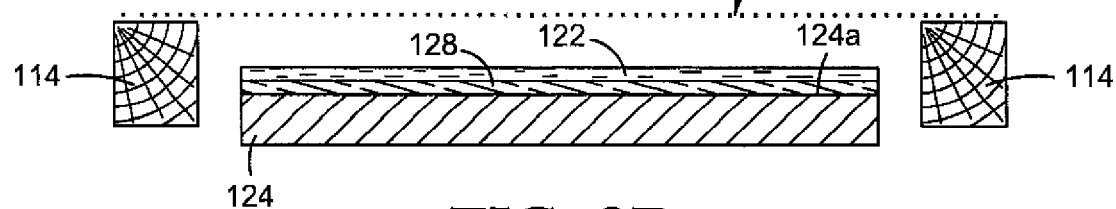

In FIG. 2B, mesh 112 is placed across the top of the frame 114. Below the mesh 112 is the platen 124 with a thin, even coating of the release fluid 122 supported on surface 124a of the platen. In some embodiments, the thickness of the release fluid 122 is about 20 micrometers ($\mu$m), but in any event less than the gauge of the mesh, and is within ±0.5 $\mu$m planarity. The release fluid 122 backs up the mesh 112 to provide good coverage of the jettable emulsion, as it is applied. The release fluid 122 is formulated to avoid adherence of the jettable emulsion to the platen 124. The formulation of the release fluid 122 prevents the emulsion from bonding, reacting, or otherwise sticking to the platen. In some cases, the emulsion may react with the release fluid 122, but that interaction/reaction typically may not allow any adhesion to the platen 124. If the adhesion to the platen 124 is greater than the adhesion to the mesh 112, then the emulsion may de-bond/delaminate from the mesh. This may cause pin holes or bare patches. In the worst case, it could cause the mesh to be damaged or to tear.

Figure 2C:
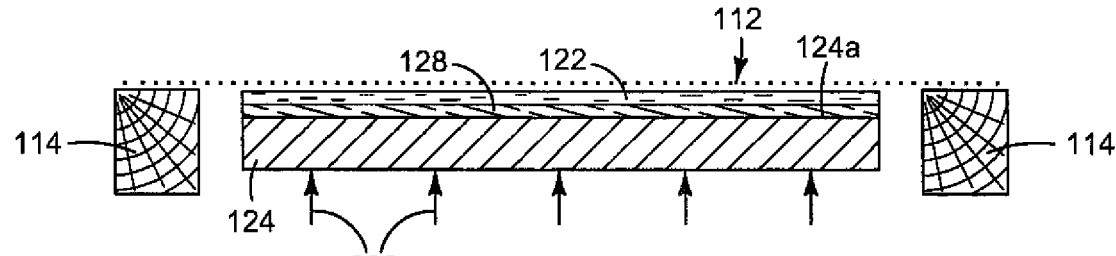

In FIG. 2C, the platen 124 with the release fluid 122 is moved up to the mesh 112, tightening the mesh and pressing the release fluid against the back of the mesh. This provides a smooth, tensioned, level surface to print on. The movement of the platen 124 is indicated by arrows 202.

Figure 2D:
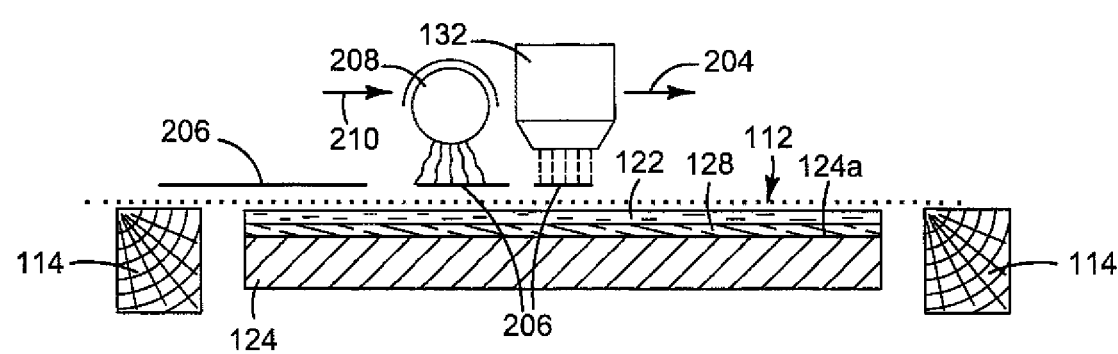

In FIG. 2D, the print head 132, which is translatable by the printer carriage 134 (not shown in FIG. 2D, but shown in FIG. 1) prints the blocking image, or stencil, 206 (seen in FIG. 2E) directly onto the mesh 112, where the blocking image is the reverse, or negative, of the actual image that is to be printed, or screened, onto a suitable print medium. The print head 132 moves laterally in the direction indicated by arrow 204 to form a screen stencil 206 on the mesh 112. The "ink" is the UV-cured jettable emulsion, described above, which is UV-cured essentially as it is applied by means of UV source 208. In an example, the UV source moves laterally in the direction indicated by arrow 210. This is similar to what happens in a conventional UV printer. FIG. 2D depicts the print head 132 and UV source 208 moving across the mesh 112. However, the mesh support system, including the mesh 112 and frame 114 (and fixture 116), could be translated relative to the print head 132 and UV source 208. The UV source 208 can be fitted to both sides of the print head 132 to facilitate bi-directional printing of the mesh 112.

Figure 2E:
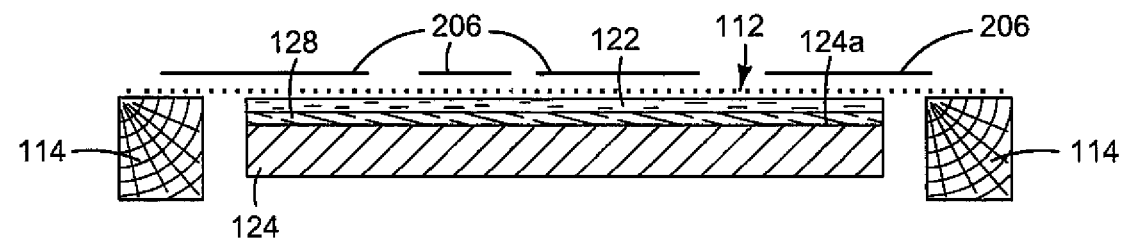

In FIG. 2E, the resulting stencil 206 is shown. The stencil 206 can be removed from the printer and used immediately without any further preparation or treatment.

In some embodiments, a layer 128 may be placed on the surface 124a of the platen 124 prior to dispensing the release fluid 122 thereon. The layer 128 is referred to herein as "Background Type". The platen 124 was kept at a constant height and then the "background" 128 was placed on it. Examples of the background type 128 include a 4 mm mirror, 2 mm clear glass, 2× glass (up), polyethylene white, glass (up)/mirror (down), 4 mm glass (up), and 3 mm mirror. So, if a 4 mm mirror, for example, was used, the print surface was 2 mm higher than with the 2 mm clear glass. Sometimes, differing results were obtained with a "two component" background. For instance, "2× glass" comprised two sheets of clear glass, "Glass (up)/Mirror (down)

was a 2 mm piece of glass on a 2 mm/14 mm mirror. Without subscribing to any particular theory, it is believed that using two plates introduces some light reflection/refraction where the two surfaces meet in the middle. "Polyethylene White" was a sheet of white polyethylene.

A comparison of results is shown in FIGS. 3A-3B, according to an example. Both Figures illustrate an emulsion applied to the mesh 112.

In FIG. 3A, in the combination 300 of a conventional spreadable emulsion 302 and mesh 112, the emulsion is seen to conformally follow the warp and weft (strands 112a and 112b) of the mesh, including both the top of the mesh and the bottom of the mesh. This conformality occurs as the spreadable emulsion 302 air-dries onto the mesh 112. In particular, FIG. 3A shows how the emulsion 302 applied in the conventional way shrinks as it dries onto the mesh 112 after being applied either by hand or with an applicator machine. This shrinkage is unavoidable as the water component dries. The emulsion 302 is one commonly used in the art.

In FIG. 3B, in the combination 350 of the jettable emulsion 302' of the present teachings and mesh 112, the jettable emulsion is seen to have a flat bottom surface 302'a, which is provided by the smooth surface 124a of the platen 124 (and the release fluid 122 thereon). The top surface 302'b of the jettable emulsion 302' is seen to be less conformal to the warp and weft of the mesh 112 than the current emulsion 302. (The bottom surface 302'a is where the screen inks will be applied and pressed through using the squeegee during the actual screen printing process.) With DtM, because the mesh 112 has the release fluid 122 supported by the smooth platen 124, the underside 302'a of the emulsion 302' is more nearly planar or flat. This is also a result of being essentially immediately cured by the UV radiation.

The process is called Direct to Mesh (DtM) to distinguish it from CtS (computer to screen), which requires additional processing both before (i.e., application of the emulsion) and after (washing off the unexposed emulsion and ink). In the DtM process, no additional processing before and after application of the jettable emulsion 302' are needed, thus simplifying the stencil 206 creation.

FIG. 4 depicts a flow chart of an example DtM process 400, in accordance with the disclosure herein, for preparing a stencil for screen printing. In the DtM process 400, the direct to mesh printer 100 is provided 405. As noted above, the DtM printer 100 includes the fixture 116 to hold the frame 114, the frame being configured to hold the pre-stretched mesh 112 in place during application of the jettable emulsion 302'. The platen 124 of the DtM printer 100 is to hold the release fluid 122 against one side of the pre-stretched mesh 112. Finally, the DtM printer 100 includes the printer carriage 134 supporting the print head 132 for printing the jettable emulsion 302' on the side of the pre-stretched mesh 112 opposite the platen 124.

The DtM process 400 continues with placing 410 the frame 114 in the fixture 116. The fixture 116 is part of the DtM printer 100 and is adapted to receive a wide variety of frame 114 sizes. The fixture 116 is configured to accurately fix the frame 114 in place, so that the printer carriage 134 is accurately registered to the mesh 112.

The DtM process 400 continues with applying 415 the release fluid 122 to the platen 124, either directly or through the mesh 112. Applying the release fluid 122 may be just as effective when applied directly to the mesh 112 as pre-applied to the platen 124. This may be important for very large stencils or very high dot density, such as 5,000 DPI, where the release fluid 122 might have time to evaporate even with a good emulsifier.

In any event, the platen 124 coated with the release fluid 122 is brought into contact with the mesh 112 (or the platen 124 is brought into contact with the mesh 112 and the release fluid 122 is applied to the mesh). In some embodiments, the platen 124 may be raised about 1 millimeter (mm) to about 2 mm above the level of the mesh to provide a tautness to the mesh 112.

The DtM process 400 continues with applying 420 the jettable emulsion 302' to the mesh 112. As noted above, the jettable emulsion 302' is applied relative to the mesh 112 by means of the inkjet printer 130, in which the inkjet print head 132 is to jet the jettable emulsion.

The DtM process 400 concludes with curing 425 the jettable emulsion 302' using UV radiation. Any common UV source may be used to cure the jettable emulsion 302'.

At the conclusion of the DtM process 400, the stencil 206 is formed and cured and is ready to be used to screen print colors onto an appropriate print surface, such as clothing, for example. In particular, the jettable emulsion after curing forms the screen stencil, in which openings in the screen stencil are to be used to print an image on the print surface.

EXAMPLES

Four series of examples were performed. In the Examples and Tables, the following definitions are now provided.

"Mesh Resolution" refers to the number of threads per centimeter (cm). The mesh resolution may include a letter to indicate the diameter of the thread, such as S (small diameter), T (medium diameter), or HD (heavy diameter). For example, "43T" is a mesh having 43 threads per cm, of medium diameter.

"Frame Type" indicates the type of frame 114 used, and may be a roller frame, aluminum, or a big roller frame. The "Aluminum" frame was a fixed square metal aluminum frame where the mesh was glued at a specific tension before starting. A typical value for the tension was about 26 Newtons (N). The "Roller Frame" was a retensionable frame, which allowed changing the tension of the mesh after the stencil was stretched. The roller frames are much more expensive than a standard square frame but are much easier to keep the tension correct and to re-stretch. The big roller frame was somewhat larger than the roller frame.

The metal mesh was a stainless steel, nickel-plated mesh. This type of mesh is frequently used for rotary screens or for screens that are exposed to aggressive fluids or long use (many prints/pressings) from the same stencil.

"Unit Resolution" is the dot density interweave (DPI) that is being jetted out of the printhead.

"Number of Pulses" refers to the number of firing pulses that are sent to an individual nozzle.

The print head used had 8 nozzle rows. The heading "Ink Channels" refers to how many rows were used to jet fluid. "All" means all 8 rows. The notation "11100111" indicates that the middle two rows were not fired; this gives the effect of a "gap" between the jetting.

"UV %" refers to the strength of the UV radiation emitted by the UV LED source 208, which was adjustable. The intensity of the UV LED source 208 was modulated with a PMW (Pulse Width Modulator) to control the intensity of the UV light generated. The maximum on the UV source 208 employed was 100 W/cm$^2$. A notation of 60%, for example, means that 60% of the UV light was modulated to 60% of full strength.

"Release Fluid" refers to the composition of the release fluid 122 that was applied to the platen 124.

"Background Type" refers to what was used on the surface of the platen 124. The platen 124 was kept at a constant height and then the "background" was placed on top of the platen. Examples of background types include a 4 mm mirror, 2 mm clear glass, 2× glass (two sheets of 2 mm clear glass), "Glass(up)/Mirror(down)" (2 mm clear glass on a 2 mm/4 mm mirror), and "Polyethylene White" (white polyethylene sheet).

"TEM" refers to Total Emulsion Measure and is a measure of the emulsion thickness. Often, a figure of EoM (emulsion over mesh) is used, but that is a ratio of emulsion thickness divided by mesh thickness. Here, the number in µm refers to overall thickness, including the thickness of the emulsion plus the thickness of the mesh.

"Smoothness" refers to the smoothness of the stencil. On the platen side, the surface should be extremely smooth to the touch, with no discernable roughness. On the print side, the surface should be smooth to the touch. Slight roughness (similar to what would be experienced with frosted glass) was considered to be "Acceptable". In the test results deemed "Not Acceptable", in general, the surface was like sand paper.

The smoothness results are based on a subjective rating, where 1 is acceptable, 2 is marginally acceptable, 3 is marginally unacceptable, and 4 is unacceptable.

"Results" refers to a subjective rating of the overall results of the experiment. The same subjective rating scale described for smoothness is used here as well.

"A4 Print Time" refers to the time it took to print a screen having the dimensions of A4 media (21.0 cm×29.7 cm).

Example Series 1

In Example Series 1, six experiments were run; the details are provided in Tables IA (Test Parameters) and 1B (Results), below. All experiments used as the jettable emulsion UV Super Flex 100 ink, which is an experimental ink. The mesh color in each case was white. The frame type was variously a roller frame, aluminum or a big roller frame, as listed in Table IA. The unit resolution in each case was 1440 DPI. The printing speed in each case was 300 cm/sec. The number of pulses was as noted in Table IA. In the first four experiments, all eight ink channels were fired, while in the last two experiments, the middle two nozzle rows of the print head were not fired, leaving a gap. The UV in each case was 60% of full strength. The release fluid in all six experiments was 100% distilled water. The background type in the first three experiments was a 4 mm mirror, while in the last three experiments was 2 mm clear glass.

As seen in Table IB, the TQM ranged from 10 µm to 22 µm (Experiments 1, 4, 5, 6); no TQM was obtained for Experiments 2 and 3, resulting from the lack of sealed mesh. For Experiment 1, while the smoothness and results were acceptable, the mesh stuck to the mirror and the resulting TQM of 22 µm was deemed to be too high. Experiments 4, 5, and 6 resulted in acceptable smoothness and results and a sealed mesh.

It appears that the 2 mm clear glass gave better results than the 4 mm mirror and further that 2 pulses gave better results than 1 pulse. It is also noted that the frame used in Experiments 2 and 3 was aluminum.

TABLE IA

DtM Testing, Mesh = 43 T, Unit Resolution = 1440 DPI - Test Parameters.

| Example | Frame Type | Number of Pulses | Ink Channels | UV % | Release Fluid | Background Type |
|---|---|---|---|---|---|---|
| 1-1 | Roller Frame | 2 | all | 60% | 100% water | 4 mm mirror |
| 1-2 | Aluminum | 1 | all | 60% | 100% water | 4 mm mirror |
| 1-3 | Aluminum | 1 | all | 60% | 100% water | 4 mm mirror |
| 1-4 | Big Roller Frame | 2 | all | 60% | 100% water | 2 mm clear glass |
| 1-5 | Big Roller Frame | 2 | 11100111 | 60% | 100% water | 2 mm clear glass |
| 1-6 | Big Roller Frame | 2 | 11100111 | 60% | 100% water | 2 mm clear glass |

TABLE IB

DtM Testing, Mesh = 43T, Unit Resolution = 1440 DPI - Results.

| Example | TEM | Smoothness | Results | Comments | A4 Print Time |
|---|---|---|---|---|---|
| 1-1 | 22 µm | 1 | 1 | Good line quality, TQM too high, mesh stuck to the mirror | 14 min |
| 1-2 | | 4 | 4 | No sealed mesh | 14 min |
| 1-3 | | 4 | 4 | No sealed mesh | 14 min |
| 1-4 | 13 µm | 1 | 1 | Sealed mesh | 14 min |
| 1-5 | 10 µm | 1 | 1 | Sealed mesh | 14 min |
| 1-6 | 10 µm | 1 | 1 | Sealed mesh | 14 min |

Example Series 2

In Example Series 2, twelve experiments were run; the details are provided in Tables IIA (Test Parameters) and IIB (Results), below. All experiments used as the jettable emulsion UV Super Flex 100 ink. The mesh color in each case was yellow. The frame type in each case was aluminum. The unit resolution in each case was 1080 DPI. The printing speed was 375 cm/sec. The number of pulses was as noted in Table II. In all experiments, all eight ink channels were fired. The UV was 60% of full strength for all experiments, except Experiment 11, where the UV was 40% of full strength. The release fluid 122 was as noted in Table IIA. The background type was a noted in Table IIA.

As seen in Table IIB, the TQM ranged from 7 µm to 20 µm; no TQM was obtained for Experiment 5 For Experiments 1-4, 6, and 12, the smoothness and results were acceptable. For Experiments 7 and 8, the smoothness and results were marginally acceptable. For Experiments 5, 9, 10, and 11, neither the smoothness nor the results were acceptable; as indicated in Table II, these experiments resulted in mesh sticking to the print surface on the platen.

The only difference between Experiments 4 and 5 was the background type used, 2× glass up vs. polyethylene. It appears that the former yields better results than the latter.

The only difference between Experiments 4 and 7-8 was the background type used, 2× glass up vs. 4 mm glass up. It appears that the former yields better results than the latter.

With regard to Experiments 9, 10, and 11, these were the only experiments to use a liquid comprising 95% distilled water and 5% ANODAL ASL (Gedacolor). Other liquids, e.g., 100% distilled water, 80% distilled water+20% Dead Sea salt, 80% distilled water+20% alcohol, and 50% distilled water+25% window cleaner+25% iso-propanol all gave acceptable or marginally acceptable smoothness and results.

TABLE IIA

DtM Testing, Mesh = 43T, Unit Resolution = 1080 DPI - Test Parameters.

| Example | Number of Pulses | Ink Channels | UV % | Release Fluid | Background Type |
|---|---|---|---|---|---|
| 2-1 | 3 | all | 60% | 100% water | 2x glass (up) |
| 2-2 | 3 | all | 60% | 80% water, 20% salt (Dead Sea) | 2x glass (up) |
| 2-3 | 3 | all | 60% | 80% water, 20% iso-propanol | 2x glass (up) |
| 2-4 | 3 | all | 60% | 50% water, 25% window cleaner, 25% iso-propanol | 2x glass (up) |
| 2-5 | 3 | all | 60% | 50% water, 25% window cleaner, 25% iso-propanol | polyethylene white |
| 2-6 | 3 | all | 60% | 50% water, 25% window cleaner, 25% iso-propanol | glass (up)/mirror (down) |
| 2-7 | 3 | all | 60% | 50% water, 25% window cleaner, 25% iso-propanol | 4 mm glass (up) |
| 2-8 | 3 | all | 60% | 50% water, 25% window cleaner, 25% iso-propanol | 4 mm glass (up) |
| 2-9 | 3 | all | 60% | 95% water, 5% ANODAL ASL liquid (Gedacolor) | 4 mm mirror |
| 2-10 | 3 | all | 60% | 95% water, 5% ANODAL ASL liquid (Gedacolor) | 4 mm mirror |
| 2-11 | 3 | all | 40% | 95% water, 5% ANODAL ASL liquid (Gedacolor) | glass (up)/mirror (down) |
| 2-12 | 3 | all | 60% | 80% water, 20% salt (Dead Sea) | glass (up)/mirror (down) |

TABLE IIB

DtM Testing, Mesh = 43T, Unit Resolution = 1080DPI - Results.

| Example | TEM | Smoothness | Results | Comments | A4 Print Time |
|---|---|---|---|---|---|
| 2-1 | 14 μm | 1 | 1 | | 10 min |
| 2-2 | 20 μm | 1 | 1 | | 10 min |
| 2-3 | 14 μm | 1 | 1 | | 10 min |
| 2-4 | 7 μm | 1 | 1 | | 10 min |
| 2-5 | | 4 | 4 | The mesh stuck to the polyester | 10 min |
| 2-6 | 7 μm | 1 | 1 | The line quality was very good | 10 min |
| 2-7 | 7 μm | 2 | 2 | The line quality was very good | 10 min |
| 2-8 | 7 μm | 2 | 2 | The line quality was very good | 10 min |
| 2-9 | 15 μm | 4 | 4 | The mesh stuck smoothly to the mirror | 10 min |
| 2-10 | 15 μm | 4 | 4 | The mesh stuck smoothly to the mirror | 10 min |
| 2-11 | 15 μm | 4 | 4 | The mesh stuck smoothly the mirror | 10 min |
| 2-12 | 7 μm | 1 | 1 | The line quality was very good | 10 min |

Example Series 3

In Example Series 3, five experiments were run; the details are provided in Tables IIIA (Test Parameters) and IIIB (Results), below. All experiments used as the jettable emulsion UV Super Flex 100 UV ink. The mesh color in each case was yellow. The frame type in each case was aluminum. The unit resolution in each case was either 1080 DPI or 1440 DPI. The printing speed was either 300 cm/sec or 375 cm/sec, as noted in Table IIIA. The number of pulses was as noted in Table IIIA. In all experiments, the middle two nozzle rows of the print head were not fired, leaving a gap ("11100111"). The UV was 60% of full strength. The release fluid 122 in all six experiments was 100% distilled water. The background type in all experiments was a 4 mm mirror.

As seen in Table IIIB, the TQM ranged from 3 μm to 45 μm. For all experiments the smoothness was acceptable, while for Experiments 3, 4, and 5, the results were acceptable. For Experiments 1 and 2, the results were marginally not acceptable, due to slight sticking of the mesh.

In Experiments 1 and 2, the number of pulses was the same for both (2), while for Experiments 3, 4, and 5, the number of pulses was different (1). It appears that this difference caused Experiments 1 and 2 to have marginally non-acceptable results.

TABLE IIIA

DtM Testing, Mesh = 120T, 43T - Test Parameters.

| Example | Mesh Resolution | Unit Resolution | Speed, cm/sec | Number of Pulses | Background Type |
|---|---|---|---|---|---|
| 3-1 | 120T | 1080 DPI | 375 | 2 | 4 mm mirror |
| 3-2 | 120T | 1440 DPI | 300 | 2 | 4 mm mirror |
| 3-3 | 43T | 1080 DPI | 375 | 1 | 4 mm mirror |
| 3-4 | 43T | 1440 DPI | 300 | 1 | 4 mm mirror |
| 3-5 | 43T | 1440 DPI | 300 | 1 | 4 mm mirror |

TABLE IIIB

DtM Testing, Mesh = 120T, 43T - Results.

| Example | TEM | Smoothness | Results | Comments | A4 Print Time |
|---|---|---|---|---|---|
| 3-1 | 14 μm | 1 | 3 | The mesh stuck slightly | 10 min |
| 3-2 | 45 μm | 1 | 3 | The mesh stuck slightly | 14 min |
| 3-3 | 3 μm | 1 | 1 | | 10 min |
| 3-4 | 7 μm | 1 | 1 | | 14 min |
| 3-5 | 7 μm | 1 | 1 | | 20 min |

Example Series 4

In Example Series 4, four experiments were run; the details are provided in Tables IVA (Test Parameters) and IVB (Results), below. The mesh resolution in all cases was 195 (US Standard). All experiments used as the jettable emulsion UV Super Flex 100 UV ink. The mesh color in each case was grey/metal. The frame type was metal. The unit resolution in each case was 1440 DPI. The printing speed was 300 cm/sec. The number of pulses was 1 for all experiments. In all experiments, the middle two nozzle rows of the print head were not fired, leaving a gap ("11100111"). In Experiments 1-3, the UV was 60%, 40%, and 30%, respectively, of full strength, while in Experiment 4, the UV was 30% of full strength. The release fluid in Experiments 1-3 was distilled water; in Experiment 2, no release fluid was used. The background type in both experiments was a 3 mm mirror.

As seen in Table IVB, the TQM was 14 μm in all experiments. For Experiments 1-3, both the smoothness and the results were unacceptable, while for Experiment 4, the smoothness and results were acceptable, In Experiments 2 and 3 of Example 1 above, the frame was aluminum, and both experiments had unacceptable smoothness and results with 100% distilled water as the liquid. In Experiment 1 of Example 4, the frame was metal, and similar unacceptable results were obtained. On the other hand, in Experiment 2 of Example 4, although the frame was also metal, no liquid was used, and acceptable smoothness and results were observed. Apparently, the combination of liquid and frame is one of the factors in whether acceptable smoothness and results are obtained. Under certain conditions, it has been found that having no release fluid or backing paper yielded better results. Based on the foregoing tests, it is possible that an emulsion can be formulated that will work without any backing surface.

TABLE IVA

DtM Testing, Mesh = 195 (US Standard) - Test Parameters.

| Example | Unit Resolution | Speed, cm/sec | Number of Pulses | UV % | Release Fluid | Background Type |
|---|---|---|---|---|---|---|
| 4-1 | 1440 DPI | 300 | 1 (28 V) | 60% | 100% water | 3 mm mirror |
| 4-2 | 1440 DPI | 300 | 1 (28 V) | 40% | 100% water | 3 mm mirror |
| 4-3 | 1440 DPI | 300 | 1 (28 V) | 30% | 100% water | 3 mm mirror |
| 4-3 | 1440 DPI | 300 | 1 (28 V) | 30% | No Liquid | 3 mm mirror |

TABLE IVB

DtM Testing, Mesh = 195 (US Standard) - Results.

| Example | TEM | Smoothness | Results | Comments | A4 Print Time |
|---|---|---|---|---|---|
| 4-1 | 14 μm | 4 | 4 | The emulsion did not cure to the metal mesh and could be removed easily. | 14 min |
| 4-2 | 14 μm | 4 | 4 | The emulsion did not cure to the metal mesh and could be removed easily. | 14 min |
| 4-3 | 14 μm | 4 | 4 | The emulsion did not cure to the metal mesh and could be removed easily. | 14 min |
| 4-4 | 14 μm | 1 | 1 | The emulsion cured well to the metal mesh. The mesh did not stick to the glass. Slight amount of UV ink on the glass which could be removed with window cleaner | 14 min |

Based on the foregoing Examples, it appears that the results may be influenced or impacted by some very complex interactions of fluids (both the emulsion and any release fluid); platen composition (e.g. single glass, dual glass, glass plus mirror, etc.); curing strength (20% to 100% UV); dot density (1080, 1440); the number of pulses; etc. From an analytic view point, it appears that the combinations are almost infinite. Currently, the only method for evaluation of a set of parameters is pragmatic; i.e., each set must be tested, based on the teachings herein. However, such testing is not considered to be undue.

Advantages of the DtM process 400 include the complete elimination of both stencil preparation and post-processing as follows:
  Machines such as emulsion applicators, dryers, separate exposure units are not needed.
  Most of the chemicals (all except degreasers) and greater than 80% of the water usage are eliminated.
  All of the processing can be done without having special low UV light rooms. Indeed, the DtM process can be carried out in normal factory/office lighting or daylight. The jettable emulsion is retained inside a UV-protected cartridge or bag when handling. It is only exposed to daylight or UV light when it is jetted onto the mesh 112.
  Because the process disclosed herein can use conventional, less expensive mesh 112, it can often be more efficient and cheaper to strip and remesh the frame 114 rather than washing the mesh, which entails water and chemicals and a special cleaning station.
  The raw unprocessed screen, or mesh, 112 is placed on the DtM printer 100 and a fully prepared, ready to use stencil 206 is removed from the screen that can be placed directly onto a carousel for printing an image onto a print surface.

Further advantages of the DtM process 400 are that each stencil 206 is very accurately registered on the mesh 112 so that it is possible to skip micro-registration when mounting on the carousel. With the DtM process 400, because each stencil 206 is accurately positioned on the frame 106 (both absolute and relative), then no adjustments are necessary or required. This is accomplished through the use of the frame fixture 116. The stencil frame typically has registration holes or point affixed to it. Each different carousel manufacturer has their own registration system. The frame fixture 116 is equipped with the same registration system (or possibly an auxiliary registration system of another design). The frame fixture 116 permits the precise alignment of the stencil frame 114. To accomplish this, a test print is done with the 4 (or 6 or more) colors, then the carousel is fine-tuned. As long as no changes to the carousel are made (or the carousel does not get out of alignment) and all stencils are created on the same printer, then the stencils will be precisely aligned.

It will be appreciated that the DtM process 400 disclosed herein has significant reductions in either or both process time and complexity, labor, and capital equipment (including specialized lighting facilities), as well as significant reductions of process chemicals and water.

The DtM process 400 can also be used for rotary screen printing. Rotary screen printing is used in labelling and other somewhat narrow but frequently repeated printing processes (wall papers, linear linoleum, etc.). Rotary screen printing is extremely fast for these applications, where each of the four colors (and any spot colors) are placed on cylinders and the material passes underneath. Rotary screen printing typically uses stainless steel mesh 112 for durability and stability.

Today, many rotary stencils are made by large service bureaus (there are about three in Europe). Each stencil can cost over 100 €uros and the yearly cost of stencil replacement can run several hundred thousand €uros. This does not even take into account the inconvenience of using the service bureau. Many companies would be able to recoup the cost of a machine in a couple of quarters while reducing their dependence on expensive service bureaus.

It is appreciated that, in the foregoing description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other.

It is to be noted that, as used in this specification and the appended claims, the singular forms "a," "an," and "the" include plural referents unless the context clearly dictates otherwise. It is appreciated that, in the foregoing description, numerous specific details are set forth to provide a thorough understanding of the examples. However, it is appreciated that the examples may be practiced without limitation to these specific details. In other instances, well-known methods and structures may not be described in detail to avoid unnecessarily obscuring the description of the examples. Also, the examples may be used in combination with each other. Furthermore, when "about" is utilized to describe a value, this is meant to encompass minor variations (up to ±10%) from the stated value, such as might be induced by variations in manufacturing.

Further, the order of process steps in the claims may be interchanged as appropriate. For example, dispensing the release fluid 122 onto the platen 124 or mesh 112 may involve dispensing the release fluid onto the platen and then bringing the platen and mesh together. Alternatively, the platen and mesh may be brought together and the release fluid dispensed onto the mesh.

While a limited number of examples have been disclosed, it should be understood that there are numerous modifications and variations therefrom. For example, the "orientation" of the printer bed/table may be changed from horizontal to vertical, due to new high/ultra-high velocity print head technologies that may permit jetting onto a vertical surface.

What is claimed is:

1. A direct to mesh screen printer for creating a screen stencil, including:
    a frame that holds a pre-stretched mesh in place during application of a jettable emulsion;
    a fixture that holds the frame;
    a release fluid;
    a platen that holds the release fluid against one side of the pre-stretched mesh;
    a fluid dispenser that dispenses the release fluid onto the platen or mesh; and
    a printer carriage that supports a print head for printing the jettable emulsion on a side of the pre-stretched mesh opposite the platen, wherein the release fluid comprises water and at least one emulsifier that prevents evaporation of the release fluid.

2. The direct to mesh screen printer of claim 1, wherein the fixture is configured to securely and firmly hold the frame with the pre-stretched mesh in place during the application of the jettable emulsion.

3. The direct to mesh screen printer of claim 1, wherein the platen is configured to hold the release fluid firmly against a bottom of the pre-stretched mesh.

4. The direct to mesh screen printer of claim 3, wherein the platen is smooth, hard, and impervious to the release fluid and resistant to dents and cracks.

5. The direct to mesh screen printer of claim 1, wherein the release fluid is applied in a very fine, even coating to the platen or directly to the mesh as it is placed on the platen to prevent adherence to the platen during the application of the jettable emulsion.

6. The direct to mesh screen printer of claim 1, wherein the release fluid is configured to inhibit dot-gain while providing a smooth, non-reactive surface for the jettable emulsion after curing.

7. The direct to mesh screen printer of claim 1, wherein the jettable emulsion has a low viscosity of about 4 cP to about 15 cP and is both durable and flexible/elastic.

8. The direct to mesh screen printer of claim 1, wherein the jettable emulsion is a UV-activated acrylate monomer with elastomeric qualities after curing.

9. The direct to mesh screen printer of claim 1, further including a UV source for curing the jettable emulsion and forming a stencil for screen printing.

10. A process, including:
    providing a direct to mesh screen printer, including a fixture to hold a frame, which is configured to hold a pre-stretched mesh in place during application of a jettable emulsion, a platen to hold a release fluid against one side of the pre-stretched mesh, and a printer carriage supporting a print head for printing the jettable emulsion on a side of the pre-stretched mesh opposite the platen;
    placing the frame in the fixture;
    dispensing the release fluid onto the platen or mesh;
    bringing the platen and the mesh together to a taut configuration;

printing the jettable emulsion on the mesh; and curing the jettable emulsion using UV radiation, wherein the release fluid comprises water and at least one emulsifier that prevents evaporation of the release fluid.

11. The process of claim 10, wherein the jettable emulsion after curing forms a screen stencil, in which openings in the screen stencil are to be used to form an image on a surface.

12. The process of claim 10, wherein the release fluid is configured to inhibit dot-gain while not adhering to the jettable emulsion following its curing.

13. The process of claim 10, wherein the jettable emulsion is a UV-activated acrylate monomer with elastomeric qualities after curing.

* * * * *